United States Patent [19]

Parks et al.

[11] Patent Number: 5,359,611
[45] Date of Patent: Oct. 25, 1994

[54] METHOD AND APPARATUS FOR REDUCING PARTIAL WRITE LATENCY IN REDUNDANT DISK ARRAYS

[75] Inventors: Terry J. Parks, Round Rock; E. Alan Davis; Geoffrey B. Hoese, both of Austin, all of Tex.

[73] Assignee: Dell USA, L.P., Austin, Tex.

[21] Appl. No.: 628,505

[22] Filed: Dec. 14, 1990

[51] Int. Cl.$^5$ .......................................... H03M 13/00
[52] U.S. Cl. ........................................................ 371/404
[58] Field of Search .................... 371/40.4, 40.1, 2.2, 371/10.1, 13, 11.1, 11.2, 21.1, 10.2, 10.3

[56] References Cited

U.S. PATENT DOCUMENTS

| | | | |
|---|---|---|---|
| 4,641,207 | 2/1987 | Green et al. | 371/21.1 |
| 4,870,643 | 9/1984 | Bultman et al. | 371/11.1 |
| 5,072,378 | 12/1991 | Manka | 371/40.1 |
| 5,077,736 | 12/1991 | Dunphy, Jr. et al. | 371/10.1 |
| 5,088,081 | 2/1992 | Farr | 371/10.1 |
| 5,101,492 | 3/1992 | Schultz et al. | 371/40.1 |

OTHER PUBLICATIONS

A Case For Redundant Arrays of Inexpensive Disks (RAID) Patterson, et al. University of California Berkeley, California.

Primary Examiner—Robert W. Beausoliel, Jr.
Assistant Examiner—Phung M. Chung
Attorney, Agent, or Firm—James Huffman; Wayne Webb

[57] ABSTRACT

An apparatus and method for a computer system having at least three disk drives in a storage array in which the rotational speed and angular position of the disk spindles are synchronized. At least two of these disks store data and at least one disk stores parity. All disks have corresponding tracks and sectors, however, the corresponding sectors of the parity disk are skewed in angular position so as to allow adequate time for the disk controller to read existing data from data disk sectors, calculate parity for new data to be written, and write the calculated parity to the corresponding sectors of the parity disk all during the same revolution of the disks.

7 Claims, 2 Drawing Sheets

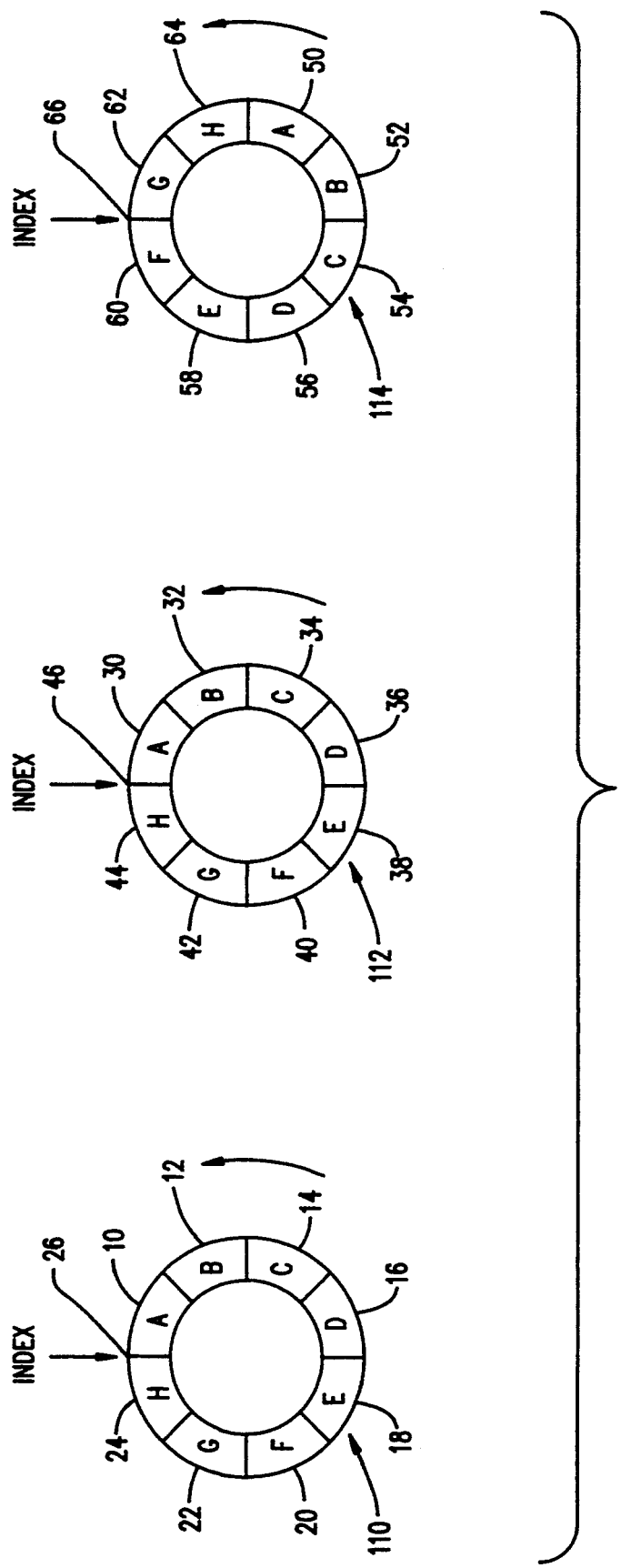

METHOD AND APPARATUS FOR REDUCING PARTIAL WRITE LATENCY IN REDUNDANT DISK ARRAYS

BACKGROUND OF THE INVENTION

1. Field of the Invention

This invention relates generally to computer digital storage systems, and in particular to computer systems using a plurality of disk drives.

2. Description of the Related Technology

Personal computers have gained substantial popularity among individual users for both business and home use. Personal computers are now being utilized for jobs heretofore performed by mainframe computers and minicomputers. The rapidly growing popularity in the use of personal computers may, in part, be attributed to the substantial improvement in both its speed of operation and random access memory (RAM) capacity.

Presently, microcomputer processors may operate at 33 Mhz clock rates and utilize 32 bit data and address buses to access two to 256 megabytes of RAM. In general, RAM speed has kept pace with processor operational speeds. However, bulk data storage utilizing magnetic disks have not. To maintain computer system performance, larger main memories are being used to buffer frequent disk access requirements for data retrieval. This may be a solution for applications that will fit entirely in the main memory of the computer and for which memory volatility is not important. However, applications such as transaction-processing which have a high rate of random requests for small amounts of data, or large simulations requiring massive amounts of data that are in excess of the main memory capacity create serious system performance limitations when using presently available disk storage technology.

Disk storage technology relies on the performance obtainable from mechanical devices. A disk storage device is comprised of a least one magnetic oxide coated platter and at least one read and write head. An electric motor is connected to a spindle that causes the platter to rotate at approximately 3600 RPM. The read/write head "floats" just above the surface of the disk platter oxide coating and moves back and forth across the face of the platter perpendicular to its rotational axis. The head moves predefined incremental distances called tracks. The disk platter is subdivided up into a number of tracks that form concentric imaginary circles on the platter face. Each track consists of a number of sectors that further divides the track into contiguously joined arcs forming a 360 degree circle. These sectors pass under the head as the disk platter rotates. A sector contains multiple bytes of data. A byte of data consists of eight bits of binary information.

Data is stored as multiples of eight bit bytes in a disk sector. For example, a sector may contain 512 bytes of data, however, the sector may also contain more or less bytes depending on the disk system and its application. In those systems that utilize sectors of 512 bytes, if less than 512 bytes of data need be stored, then blank or dummy data is added to make up a full sector of data. If more than 512 bytes of data are stored then additional sectors are used.

Storage capacity of disk systems vary widely depending on platter size, number of platters, type of track and sector formatting and the precision of head positioning mechanisms. Mass production of disk systems for personal computers have created low cost and high performance disks having data storage capacities of a hundred megabytes or more. Larger capacity disk systems, utilized in minicomputer and large mainframe computer systems, are typically several thousand megabytes or more. The cost per megabyte of a thousand megabyte disk is more than twice the cost per megabyte of the mass produced disks used in personal computers. Reliability is equivalent between either individual type of disk. However, power consumption and size are much lower per megabyte for the small disk systems.

In choosing a disk system for computer applications requiring thousands of megabytes of data storage one must evaluate two different approaches for implementation of a suitable disk system. The first and traditional approach utilizes one or more large capacity (thousands of megabytes) disks, the second utilizes a large number of smaller capacity disks. Redundant Arrays of Inexpensive Disks ("RAID), based on magnetic disk technology developed for personal computers, offers an attractive alternative to the large capacity disks. RAID arrays offer improved performance, lower power consumption and lower incremental costs for additional capacity than do the large capacity disk systems.

The problem with using a large number of small capacity drives is that disk system reliability degrades to an unacceptable mean time between failures because of the large number of drives that make up the complete disk system. The computer industry has reduced the seriousness of possible frequent failures of multiple disks by using a parity checking and data correcting system designed to operate during all data read and write operations of the disk system. Parity is used to improve the reliability and integrity of disk system data storage by determining if data has been corrupted and in some cases may be used to correct the corrupted data. For example, data bytes contained in sector 1 of disk A may be compared with data bytes contained in corresponding sector 1 of disk B by calculating the exclusive OR (XOR) between each bit of all corresponding bytes and storing the results as corresponding parity bytes in a third disk used exclusively for parity. More than two data disk contents may be used in calculating parity.

Normally, the computer system calculates disk data parity before writing the data to the disks. However, when writing or modifying small amounts of data the disk controller must first read the disks for previously stored corresponding data not being modified in order to calculate a new parity based on the new data to be written and the existing unmodified data. The new calculated parity is written to the parity disk.

A disk normally rotates at a speed of 3600 RPM. At this rotational speed the head passes over a particular sector every 16.67 milliseconds. Thus, the longest time required to align the head with the sector of interest would be less than or equal to 16.67 milliseconds. This delay is called rotational latency time. Data storage and retrieval latency time may be decreased by interleaving the read and write operations of a multiple disk system. Interleaving means that data is read from or written to alternate disks.

When interleaving data operations between multiple disks, a first block of data is written to or read from disk A, a second block of data is handled by disk B, a third block of data is handled by disk C, a fourth block of data is handled by disk D, etc. After all data disks are so utilized, the interleaving cycle starts anew with the first disk A. Interleaving reduces the time required to transfer blocks of data because disk operations may be performed during the rotational latency times of the multiple disk system. For example, to write 10,240 bytes of data onto two disks, each disk having 512 byte sectors, would require the use of 10 sectors from each disk. The first block of data containing 512 bytes is written to or read from the first disk. The next block of data is written to or read from the second disk and subsequent blocks of data containing 512 bytes each are alternately transferred to/from each disk.

When data blocks in excess of 512 bytes are to be written to the disks, the disk controller may buffer an amount of data limited only by the amount of buffer or cache memory available in the controller. The disk controller writes this buffered data to the appropriate sectors of each disk. The controller must wait for the correct sectors to align with the write head before data can be transferred. When transferring data to a disk, a latency time of one revolution of the disk platter may result if the sector to be read or written has just passed the read/write head.

When using multiple disks in a disk storage system, synchronization of rotational speed and sector position may be accomplished by phase-lock-loop control which is well known in the art of disk systems. Phase-lock-loop control of the rotational speed and position allows rotational alignment for each of the corresponding sectors of the drives. Thus, sector 5 of disk 1 may be read or written at the same time as sector 5 of disk 2. Disk synchronization averages rotational latency to one half a revolution or 8.33 milliseconds instead of the possibility of a full revolution latency of 16.67 milliseconds.

Rotational synchronization of all disks also allows simultaneous read or write operations of data and parity for a stripe of data. A stripe comprises the corresponding sectors of data and parity contained on all disks of the system. Thus, from the above example, stripe 5 comprises the data found on sector 5 of each data disk and the sector 5 parity from the parity disk.

When less than a full stripe of data is to be stored, the disk controller must read the data in the stripe not being modified so that the unmodified stripe data and the new data may be utilized to calculate the new stripe parity. However, the corresponding parity disk sector has already passed by the disk head during this read and parity calculation operation. Thus, the new stripe parity cannot be written to the corresponding parity disk sector until the next disk revolution or 16.67 milliseconds after the parity is calculated.

The time latency of a synchronized multiple disk system write operation averages only one half revolution or 8.33 milliseconds, therefore, requiring an additional revolution or 16.67 milliseconds for writing parity in a read-modify-write operation. This additional parity write latency time is unacceptable. Present disk systems using the above techniques simply ignore this poor write performance hoping that the excessive write time latency will be made up by good read performance.

SUMMARY OF THE INVENTION

In contrast to prior methods and systems for writing parity in a read-modify-write operation, the system and method of the present invention eliminates the additional disk revolution necessary in the prior art synchronized multiple disk systems. The system and method of the present invention overcomes the problems and limitations of the prior art by skewing the sectors on which the parity is stored such that there is sufficient time to read data and calculate the parity to be written before the appropriate parity sector comes under the write head of the parity disk.

Skewing is relative to an index pulse. The index pulse indicates when a given point on the disk platter passes a fixed reference in the disk system. The index pulse is used to synchronize both the rotational speed and position of the disk spindles so that each corresponding sector of each disk aligns with the read/write heads at the same time.

Adjusting the skew of the parity drive sectors effectively time delays when a corresponding parity sector aligns with the write head. The parity sectors may be skewed (time delayed) by low level formatting of the parity disk (i.e. assigning No. 1 to actual sector No. N on the parity disk to achieve desired skew) or may be electronically skewed through control logic in the multidisk phase-lock-loop controller. In this preferred embodiment, the parity data is logically written to a parity disk sector N, selected to achieve the desired skew. Optimal time skew may be determined experimentally or may be calculated knowing all variables of the disk data storage system.

An object of the present invention is to calculate parity of existing and new data, and write this parity to a parity disk after a read-modify-write data disk operation without having to wait for a subsequent disk revolution that adds excessive latency time to disk data access.

A further object of the present invention is to provide a means to read and write data sectors comprising a stripe, and calculate and store the resulting parity within one revolution of the system disks.

Another object of the present invention is to provide a means for a synchronous multidisk storage system to decrease read-modify-write latency time for multiple data transfers.

Still another object of the present invention is to position skew the parity disk sectors by means of low level formatting of the sectors onto the parity disk.

A further object of the present invention is to compute the exclusive OR of the existing and new data comprising a data stripe and write the calculated exclusive OR to the parity sector of the stripe within the same disk revolution as the data disk read and write operations.

Other and further objects, features and advantages will be apparent from the following description of the preferred embodiment of the invention, given for the purpose of disclosure and taken in conjunction with the accompanying drawings.

BRIEF DESCRIPTION OF THE DRAWINGS

FIG. 2 is a schematic diagram of multiple disk platters.

DETAILED DESCRIPTION OF THE PREFERRED EMBODIMENT

Figure 1:
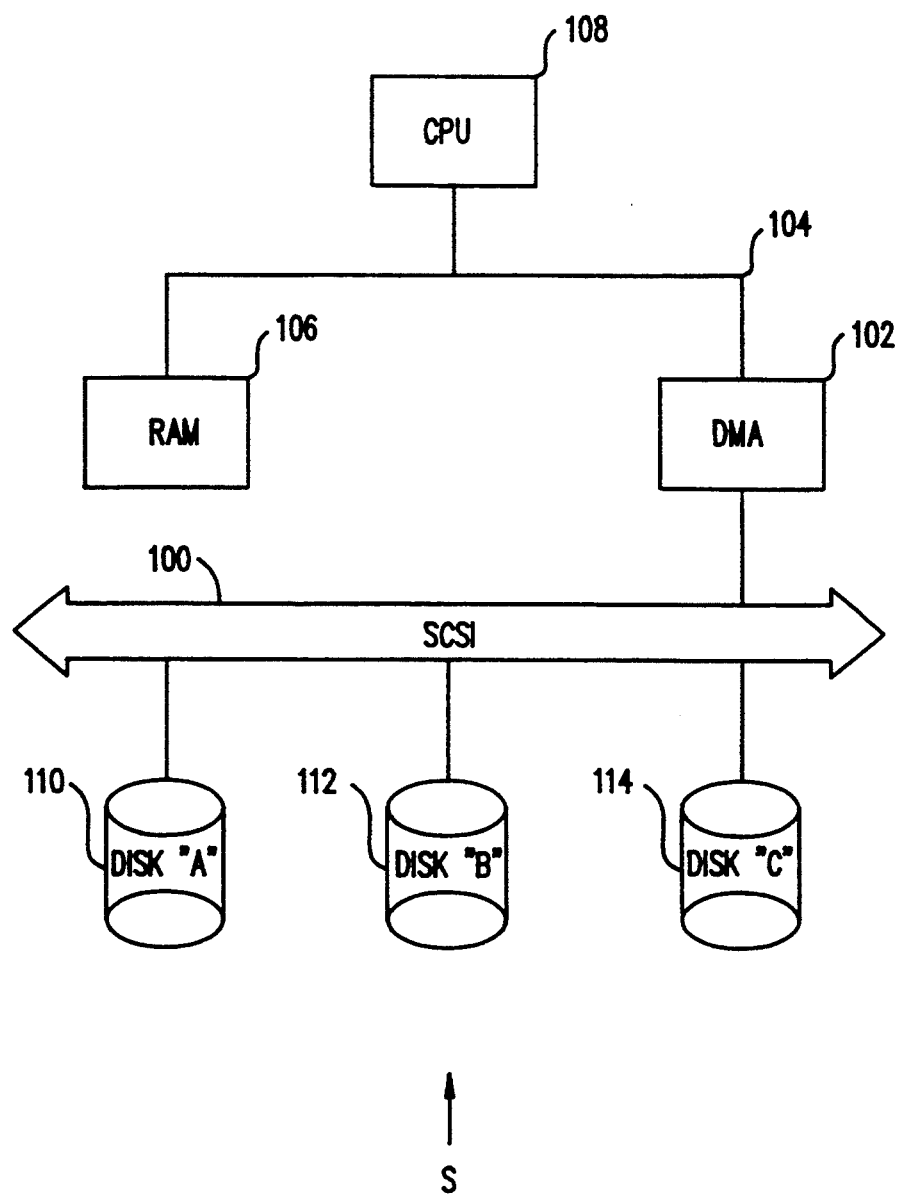
FIG. 1 is a partial block diagram of a typical computer system.

Referring now to the drawings, the details of the preferred embodiment are illustrated. In the drawings the letter S designates generally a multidisk system of the invention. In this preferred embodiment, the disk system is a type CP3204 Connor Drive, which incorporates a phase lock loop controller. The disk system may interface to an ANSI X3.131-1986 Small Computer Synchronous Interface ("SCSI") 100 which connects to a direct memory access ("DMA") controller 102. The DMA controller 102 connects to the computer data and control bus 104 allowing direct transfer of data to or from the random access memory ("RAM") 106. In this preferred embodiment, an Intel type 82355DMA is used. A central processing unit ("CPU") 108 utilizes the data and instructions contained in RAM 106 for program execution. In this preferred embodiment, a type 80386 Intel central processor unit is used.

Disk "A"110 and disk "B"112 may be used to store data, and disk "C"114 may be used to store parity. Disks 110 and 112 represent an interleaved data storage system, however, more than two disks may be used for interleaved data storage. Similarly more than one disk may be used for storing parity values. Disk controllers may also be integral with the disk drives.

Referring now to FIG. 2, schematic representations of the platters of disks 110, 112 and 114 are illustrated. Each disk platter is illustrated with one track and eight sectors. Disk 110 has sectors 10-24, disk 112 has sectors 30-44 and disk 114 has sectors 50-64. Those skilled in the art will readily appreciate that a disk may be comprised of multiple platters, and many tracks and sectors. For example, disks 110, 112 and 114 rotate counter-clockwise and have index means 26, 46 and 66 respectively to indicate when sectors 10, 30 and 50 are at a specific point during rotation.

Disks 110, 112 and 114 may be synchronized in both rotational speed and position by means of a phase-lock-loop controller which is well know in the art of disk systems. Having all corresponding disk sectors align at the same time with the read/write head of each disk allows simultaneous read or write operations to be performed on a stripe of data. A stripe of data comprises data contained on the corresponding sectors of data disks 110 and 112 and the parity from the corresponding sector of the parity disk 114.

During a read operation, for example, data may be read from sectors 10 and 30, then parity is read from sector 50. Each sector may contain 512 bytes of data. Assuming that disks 110, 112 and 114 rotate counter-clockwise at 3600 RPM or one revolution every 16.67 milliseconds, each sector will pass under the read/write head for 2.08 milliseconds. As illustrated in FIG. 2, parity disk 114 has its sector 50 skewed (delayed in rotational time) to the data disk sectors 10 and 30 by two sector lengths or 4.16 milliseconds.

Skewing is relative to an index pulse. The index means 26, 46 and 66 produce index pulses which are used to indicate when a given point on each of the disks 110, 112 and 114, respectively, passes a fixed reference. The index pulse is used to synchronize both the rotational speed and position of the disk spindles so that each corresponding sector of each disk aligns with the read/write heads at the same time.

Adjusting the skew of the parity drive sectors effectively time delays when a corresponding parity sector aligns with the write head. The parity sectors may be skewed (time delayed) by low level formatting of the parity disk. They may be electronically skewed through control logic in the multidisk phase-lock-loop controller. In this preferred embodiment the parity data is logically written to the parity disk, as noted above. Optimal time skew may be determined experimentally or may be calculated knowing all variables of the disk data storage system.

In a practical disk system there are many more sectors in a disk than are shown in the above example, therefore corresponding delay times are much shorter. In the above example, the parity read will delay the total system read by 4.16 milliseconds because of the parity disk sector skew, however many sector read operations normally are performed and, usually, the disk controller has buffer or cache memory to compensate for the mechanical slowness of the disk rotation.

In similar fashion, a write operation to all data disk sectors of a stripe will be written at the same time and the calculated parity for the write data will be written to the corresponding sector of the parity disk 114 4.16 milliseconds later. As mentioned above, cache memory buffers bulk data transfers from the computer RAM to the disk system.

When a write operation does not have a sufficient number of data bytes to write to all of the data stripe sectors, the unmodified sectors of the stripe must be read so that parity may be recalculated for the entire stripe of data. Prior art disk systems read the unmodified data from the appropriate data disk sectors than had to wait a complete disk revolution or 16.67 milliseconds before the new parity could be written to the corresponding sector of the parity disk. The system and method of this invention eliminates this, relative to data transfer rates, long latency time for writing parity.

Using the system and method of the present invention reduces the latency time for writing parity to the minimum necessary for proper disk system operation. Assume, for example, that data is only written to sector 10 of disk 110. Data must be read from sector 30 of disk 112 to calculate the data stripe parity. Because sector 50 of disk 114 is skewed in time, the controller logic circuits have plenty of time to calculate and write parity to corresponding sector 50 of disk 114 during the same disk revolution in which the data transfers occurred.

The system and method of the present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will readily suggest themselves to those skilled in the art and which are encompassed within the spirit of the invention and the scope of the appended claims.

What is claimed is:

1. In a computer system including a processor, random access memory and a data storage system having multiple disks rotated by disk spindles in which rotational speed and angular position of said disk spindles are synchronized, said data storage system comprising:
    at least three disk drives, each of said disk drives having corresponding tracks and sectors for storing digital data within said sectors;
    control means for writing digital data to and reading digital data from said tracks and sectors of said disk drives, said control means connected to said disk drives; wherein
    at least one of said disk drives is used to store parity data, and the other of said disk drives is used to store general data, said parity data calculated from the general data stored on said corresponding sectors of said disk drives containing said general data; and wherein
    said sectors containing said parity data being position skewed in relation to said corresponding sectors of said disk drives containing said general data so that said control means may read or write said general data across corresponding data stripes and calculate parity for said corresponding data stripes of said disk drives containing said general data before writing the calculated parity onto corresponding sectors of said disk drives containing parity data and before said disk drives containing said parity data have completed a full revolution after reading or writing said general data.

2. The computer system of claim 1, wherein each sector of said disk drives stores 512 bytes of digital data.

3. The data storage system of claim 1, wherein a stripe of data comprises the general data and the parity data stored on corresponding sectors of said disk drives.

4. The data storage system of claim 1, wherein the calculation of parity comprises the steps of reading data values of all corresponding sectors of said disk drives containing general data which are not being written to: and computing an exclusive OR (XOR) of said data read with data which is being written.

5. The computer system of claim 1, wherein the position skewing of the parity disk sectors is accomplished by low level formatting the sector skew onto said parity disk.

6. The data storage system of claim 1, wherein the position skewing of the parity disk sectors is accomplished by logically writing the parity data to parity disk sector N which is selected to provide a desired parity skew.

7. A method for reducing write a write latency in redundant disk arrays in a computer system, said computer system including a processor, a random access memory and a multiple disk data storage system having multiple disks rotated by disk spindles, and in which rotational speed and angular position of the disk spindles are synchronized and wherein at least one of said multiple disks is a parity disk, and the other of said multiple disks are data disks, wherein parity of a data stripe write operation is calculated and written to said parity disk within a same disk rotation as a read and a write operation to said data disks, said method comprising the steps of:

writing new data to sectors of at least one of said data disks;

reading data from sectors of the other of said data disks which correspond with said written new data sectors;

calculating parity of data stripes wherein said data stripes are comprised of said new data written and said data read; and writing said calculated parity to sectors of said parity disk which correspond with said sectors of said new data written and said data read within the same disk revolution that said new data was written, said parity disk having position skewed corresponding sectors so as to allow adequate time for reading data sectors containing existing stripe data, writing new data to corresponding data sectors, and calculating and writing parity of data stripes to said parity disk.

* * * * *